(12) United States Patent
Tsuchida et al.

(10) Patent No.: US 6,776,531 B2
(45) Date of Patent: Aug. 17, 2004

(54) ROLLING BEARING WITH SEAL PLATE

(75) Inventors: Yuki Tsuchida, Fujisawa (JP); Masao Takeda, Fujisawa (JP); Takahiko Uchiyama, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/838,015

(22) Filed: Apr. 19, 2001

(65) Prior Publication Data

US 2002/0009246 A1 Jan. 24, 2002

(30) Foreign Application Priority Data

| Apr. 27, 2000 | (JP) | ......... 2000-127228 |
| Sep. 22, 2000 | (JP) | ......... 2000-288416 |
| Jan. 16, 2001 | (JP) | ......... 2001-007574 |
| Apr. 16, 2001 | (JP) | ......... 2001-117185 |

(51) Int. Cl.$^7$ .................................. F16C 33/76
(52) U.S. Cl. .......................... 384/484; 384/486
(58) Field of Search .................. 384/484, 486, 384/485, 481, 482, 477; 277/560, 561, 562

(56) References Cited

U.S. PATENT DOCUMENTS

| 2,830,858 A | * | 4/1958 | Moorman et al. ......... 384/484 |
| 3,113,814 A | | 12/1963 | Ogura |
| 3,700,296 A | | 10/1972 | Bugmann |
| 4,054,334 A | * | 10/1977 | McAllister et al. ........ 384/484 |
| 4,309,916 A | | 1/1982 | Ohkuma et al. |
| 4,428,629 A | * | 1/1984 | Colanzi et al. ............. 384/144 |
| 4,588,312 A | * | 5/1986 | Dickinson et al. ......... 384/482 |
| 4,605,319 A | * | 8/1986 | Korenhof .................... 384/484 |
| 4,650,195 A | * | 3/1987 | Dreschmann et al. ...... 384/486 |
| 4,805,919 A | * | 2/1989 | Wiblyi et al. .............. 277/560 |
| 5,037,213 A | * | 8/1991 | Uchida et al. .............. 384/482 |
| 5,333,957 A | * | 8/1994 | Yip et al. ................... 384/484 |
| 5,383,728 A | * | 1/1995 | Micca et al. ............... 384/484 |
| 5,697,711 A | * | 12/1997 | Aoki et al. ................. 384/484 |
| 5,909,880 A | * | 6/1999 | Waskiewicz ............... 277/561 |

FOREIGN PATENT DOCUMENTS

| DE | 11 69 214 B | 4/1964 |
| DE | 84 30 773 U | 11/1985 |
| DE | 35 28 961 A | 2/1987 |
| DE | 4215905 A1 | * 11/1993 |
| EP | 0 816 699 A | 1/1998 |
| JP | 5272543 | * 10/1993 |
| JP | 11-247867 | 9/1999 |

* cited by examiner

Primary Examiner—Thomas R. Hannon
(74) Attorney, Agent, or Firm—Katten Muchin Zavis Rosenman

(57) ABSTRACT

A rolling bearing with seal plate for transmission comprising: an inner race that has an inner ring raceway around its outer peripheral surface in the middle in the axial direction; an outer race that has an outer ring raceway around its inner peripheral surface in the middle in the axial direction; a plurality of rolling bodies that are located between the inner ring raceway and the outer ring raceway such that they rotate freely; and a seal plate that is made of synthetic resin and has one of the peripheral edges attached to part of one of the inner race and outer race, and the other of the peripheral edges made to come in sliding contact with a cylindrical surface of the other of the inner race and outer race therearound in parallel to the central axis thereof.

6 Claims, 4 Drawing Sheets

ROLLING BEARING WITH SEAL PLATE

BACKGROUND OF THE INVENTION

1. Field of the Invention

This invention relates to a transmission and a rolling bearing with seal plate for that transmission, and more particularly to improvements in the transmission (including a transaxle) for an automobile, truck, or a special kind of vehicle such as a tractor or fork lift, and to improvements in the rolling bearing with seat plate that is installed in that kind of transmission. The transmission which is the object of this invention, includes a manual transmission, as well as all kinds of automatic transmission such as planetary-gear type, belt type and toroidal type.

2. Description of the Related Art

An example of an automatic transmission that has a rolling bearing with seal plate installed in it as disclosed in U.S. Pat. No. 4,309,916, is shown in FIG. 3. In the manual transmission, simply shown in FIG. 3, lubrication oil (transmission oil) 25 is stored in a casing 24, and an input shaft 26 and output shaft 27 are arranged in the casing 24 such that they are concentric with each other and can freely rotate relative to each other. Moreover, there is also a transmission shaft 28 located inside the casing 24 such that it is parallel with respect to the input shaft 26 and output shaft 27. The input shaft 26, output shaft 27 and transmission shaft 28 are supported respectively by a rolling bearing 1 with seal plate such that they can rotate freely.

A drive gear 29, which is a power transmission member on the drive side, is supported on the input shaft 26. Also, on the output shaft 27, there are follower gears 30a to 30d, which are power transmission members on the follower side, and they are each supported by a synchro mesh mechanism (not shown in the figure). During operation, only one of the aforementioned follower gears 30a to 30d rotates together with the output shaft 27, and the other follower gears rotate relative to the output shaft 27.

Moreover, at respective sections of the transmission shaft 28 which face the drive gear 29 and follower gears 30a to 30d, there are transmission gears 31a to 31e which are supported such that they rotate freely with the transmission shaft 28. These transmission gears 31a to 31c are made to mesh with the drive gear 29 and follower gears 30a to 30d directly or by way of an idler gear 32 for moving back.

As described above, a plurality of rotating shafts and many gears are assembled in the automobile transmission. These rotating shafts and gears are supported by rolling bearings, such as ball bearings or cylindrical roller bearings, such that they rotate freely with respect to the housing and support shaft. On the inside of this kind of transmission, there is a lot of foreign matter, such as grinding scraps or grinding agent, that is caused in processing the gears or housing etc., and adheres to and remains on the gears or housing, or as abrasive material that is generated in the section where the gears mesh during operation. When this kind of foreign matter gets inside the rolling bearing, indentations are formed by the foreign matter on the rolling contact surfaces, and these indentations make it easier for the surfaces to become damaged due to fatigue. Therefore, conventionally, a rolling bearing 1 with seal plate, as shown in FIG. 4, is used as the rolling bearing for use in conditions where there exist much metallic foreign matter as described above.

This rolling bearing 1 with seal plate comprises: an inner race 3 having inner ring raceway 2 of the deep-groove type formed around its outer peripheral surface in the center in the axial direction (left and right direction in FIG. 4), an outer race 5 arranged concentric with the inner race 3 and having an outer ring raceway 4 of the deep-groove type formed around its inner peripheral surface in the middle in the axial direction, and a plurality of rolling bodies or balls 6 located between the inner ring raceway 2 and outer ring raceway 4 such that they can rotate freely. These balls 6 are supported inside a plurality of pockets 8 which are formed in a retainer 7, such that each ball 6 can rotate freely itself in each pocket 8. Instead of the balls 6, shown in the example in the figure, it is also possible to use cylindrical or tapered rollers as the rolling bodies.

Moreover, attachment grooves 9 are formed around the inner peripheral surface on both ends of the outer race 5, and the outer peripheral edges of the seal plates 10 are attached to the attachment grooves 9. These seal plates 10 are generally circular shaped and comprise a circular-shaped metal core 11 that is made of a metal plate such as a steel plate and an elastic member 12 such as a rubber-like elastomer which is reinforced by the metal core 11. The outer peripheral edge of the elastic member 12 is made to protrude outward in the radial direction (up and down direction in FIG. 4) only a little from the outer peripheral edge of the metal core 11, and this protruding section fitted into and attached to the attachment groove 9.

On the other hand, the inner peripheral edge of the elastic member 12 is made to protrude sufficiently inward in the radial direction from the inner peripheral edge of the metal core 11 to form a seal lip 13 in the protruding section. In addition, seal grooves 14 are formed on the outer peripheral surface on both ends of the inner race 3 such that they are defined by an inner wall surface 15 and outer wall surface 16, and the tip edge of this seal lip 13 comes in contact with the inner-wall surface 15 of seal grooves 14. Here, the tip edge of this seal lip 13 is forked with reference to the axial direction, such that even when the inner race 3 or outer race 5 is displaced in the axial direction, the tip edge of this seal lip 13 is always in sliding contact with at least one of the inner wall surface 15 and outer wall surface 16 of the seal groove 14.

With the rolling bearing 1 with seal plate, constructed as described above, relative rotation of the member around which the inner race 3 is attached and the member inside which the outer race 5 is attached is allowed by the rolling of the balls 6. Moreover, the pair of seal plates 10, whose outer peripheral edges are fitted into the inner peripheral surface on both ends of the outer race 5, prevents the grease that is filled inside the space 17 where the balls 6 are located, from leaking out, and also prevents foreign matter on the outside such as dirt, oil, or water from getting into the space 17 where the balls 6 are located.

In the case of the seal plate 10 comprising the metal core 11 and the elastic member 12 made of a rubber-like elastomer or the like, not only is the cost high, but it is also difficult to make the seal plate 10 more lightweight and reusable (recyclable). In other words, weight of the seal plate 10 is increased by the amount of the metal core 11 that is used to reinforce the elastic member 12. In addition, since the elastic member 12 is attached to the metal core 11, the manufacturing cost increases, and the seal plate 10 becomes more difficult to reuse.

In the case of just reducing the manufacturing cost, it is considered to be possible to use inexpensive nitrile rubber (NBR) as the elastic member 12. However, when NBR is used in the high-temperature conditions in an automobile transmission or in an environment with constant contact with oil, the material soon becomes hard and in poor condition, and thus there is a possibility that a proper seal cannot be maintained over a long period of time.

On the other hand, in the case of using an acrylic rubber or fluorine-contained rubber which comparatively does not easily become hard or degrade in high-temperature environment, the cost and weight increase and reusability becomes difficult, so from the aspect of protecting the environment, it is not preferred.

On the other hand, when the seal plate is made of synthetic resin, it becomes easier to reduce the weight of the seal plate and improve its reusability, and it also becomes possible to lower the manufacturing cost since mass production can be improved by use of a die.

However, when the seal plate is constructed in this way using synthetic resin, it becomes difficult to secure the seal performance of this seal plate. In other words, since it is more difficult for synthetic resin to elastically deform than rubber, even when the seal plate is made of the synthetic resin in the shape shown in FIG. 4, such that the tip edge of the seal lip on the inner peripheral edge of the seal plate 10 is constantly in sliding contact with either the inner wall surface 15 or outer wall surface 16 of the seal groove 14, it is difficult to attach the seal plate to the outer race 5 while the seal lip is extended on the inside of the seal groove 14.

Moreover, when an elastic force is applied to the tip edge of the seal lip, in other words, when the tip edge of the seal lip comes in sliding contact with the inner wall surface 15 of the seal groove 14 having interference in the axial direction, it is easy for the resistance (load torque) of the rolling bearing with seal plate to become large by the amount that it is more difficult for the synthetic resin to deform elastically in comparison to rubber.

SUMMARY OF THE INVENTION

An object of this invention, taking the aforementioned problems into consideration, is to provide a rolling bearing with seal plate for a transmission in which the seal plate is made of synthetic resin, and it is always possible for the peripheral edge of the seal plate to slide freely over the entire surface of an inner race or outer race as required even when the race is displaced in the axial direction.

DESCRIPTION OF THE PREFERRED EMBODIMENTS

Figure 1:
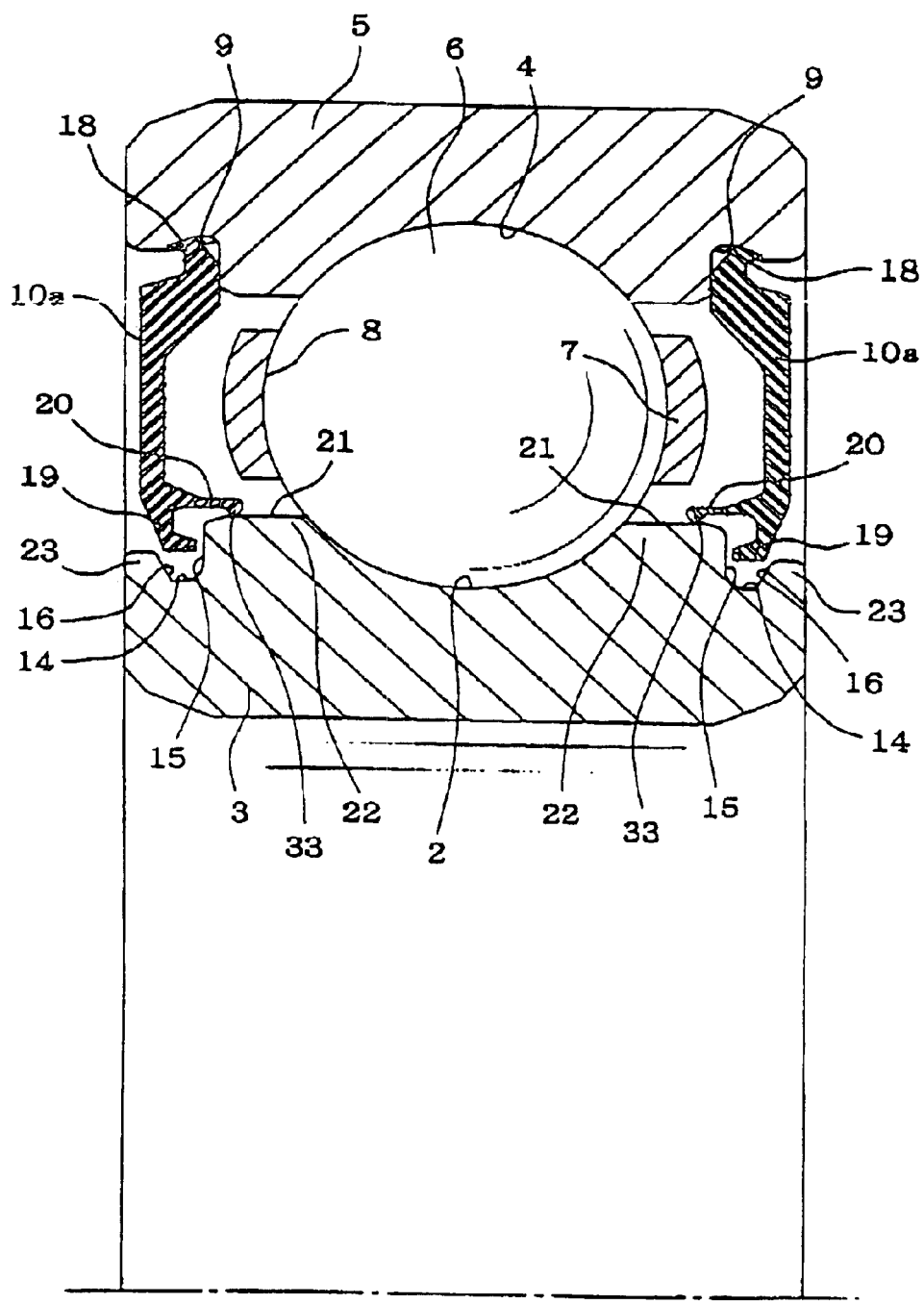
FIG. 1 is a cross sectional view of one half of the rolling bearing in a first example of the embodiment of the present invention.

Similar to a conventional rolling bearing with seal plate, the rolling bearing with seal plate for transmission according to this invention comprises: an inner race that has a inner ring raceway around its outer peripheral surface in the middle in the axial direction; an outer race that has an outer ring raceway around its inner peripheral surface in the middle in the axial direction; a plurality of rolling bodies that are located between the inner ring raceway and the outer ring raceway such that they rotate freely; and a seal plate that has one of the peripheral edges attached to part of one of the inner race and outer race, and the other of the peripheral edges made to come in sliding contact with part of the other of the inner race and outer race.

Particularly, in the rolling bearing with seat plate for transmission of this invention, the seal plate is made of synthetic resin.

In addition, it is preferable for at least one of the seal lips defining the other of the peripheral edges of the seal plate to protrude toward a cylindrical surface which partly defines the peripheral surface of the other of the inner race and outer race, in parallel to the center axis of the other race, and for the tip edge of this seal lip to come in sliding contact all the way around this cylindrical surface.

Also, it is preferable that the cylindrical surface on which the tip edge of the seal lip comes in sliding contact be the peripheral surface of shoulder sections of the other race between which the rolling bodies are held, and the tip edge of the seal lip on either axial side comes in sliding contact with the shoulder section on either side.

Furthermore, the transmission of this invention, is also similar to the conventionally known transmission described above, in that it comprises; a casing in which lubrication oil is held; an input shaft and output shaft, which are supported inside the casing by rolling bearings such that they can rotate freely; a power transmission member on the drive side, which is supported by and rotated with the input shaft; a power transmission member on the follower side which is supported by the output shaft and which is engaged with the power transmission member on the drive side for power transmission, so that it rotates with the output shaft as the input shaft rotates.

Particularly, the rolling bearing used in the transmission of this invention, is the rolling bearing with seal plate for transmission of the invention described above.

In the rolling bearing with seal plate and the transmission using the rolling bearing according to this invention, constructed as described above, since the seal plate is made of synthetic resin, so weight reduction and reusability of the seal plate is simplified, and by simplifying mass production of the seal plate with a die, it also becomes possible to reduce the manufacturing cost of the seal plate.

Moreover, by employing the preferred construction, it is possible to secure the sufficient seal performance even when the inner race or outer race is displaced in the axial direction, since there is constant sliding contact between the tip edge of the seal lip all the way around the cylindrical surface. Specifically, at least one seal lip defining the other peripheral edge of the seal plate is made to protrude toward a cylindrical surface that is part of the surface of the other race in parallel with the center axis of the other race, and the tip edge of this seal lip comes in sliding contact all the way around this cylindrical surface. This makes it possible to maintain sliding contact between the tip edge of the seal lip and the cylindrical surface even when the inner race or outer race is displaced in the axial direction. Therefore, a rolling bearing with seal plate for transmission, in which the seal plate is constructed of a lightweight and reusable synthetic resin, and which has a sufficient seal performance, is possible.

Now, examples of the present invention are further explained referring to the drawings attached.

Figure 4:
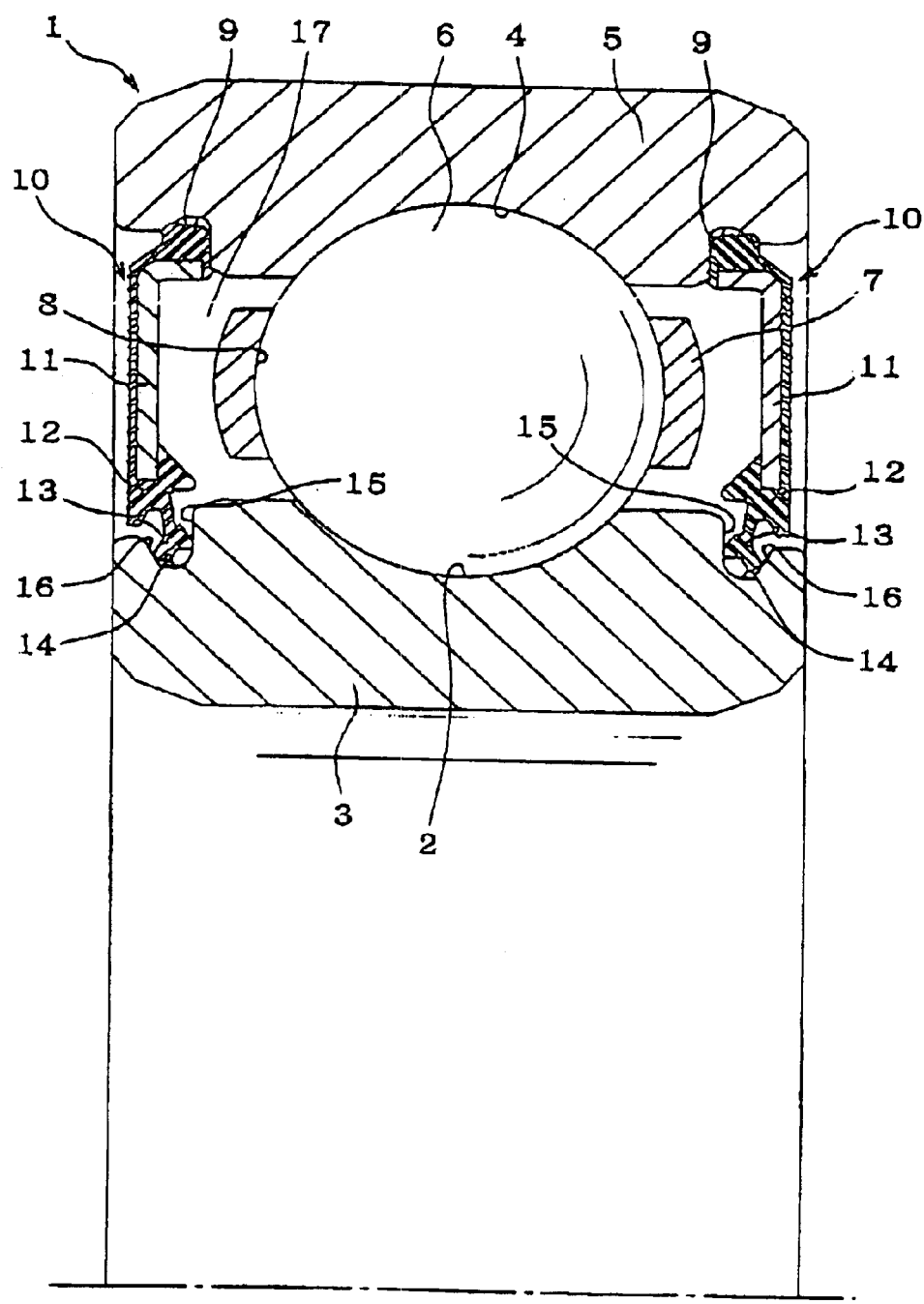
FIG. 4 is a cross sectional view of one half of the rolling bearing with seal plate in a conventional example.

FIG. 1 shows a first example of the embodiment of the invention. In this invention, the seal plate 10a, which is made of synthetic resin, is tailored in specifically the shape of the seal lips 19, 20 that define the inner peripheral edge of the seal plate 10a and the position where they come in sliding contact with the outer peripheral surface of the inner race 3 in order to secure the seal performance of this seal plate 10a. The basic construction of the rolling bearing with seal plate itself is similar to the prior construction shown in FIG. 4, so the like codes are used for like parts and any redundant explanation of those parts is omitted, and the explanation below will center on the characteristic parts of this invention.

There are attachment grooves 9 formed all the way around the circumference on both ends of the outer race 5 in the sections that are separated from the outer ring raceway 4. The outer peripheral edges of generally circular seal plates 1a made of synthetic resin are anchored in these attachment grooves 9.

There is an elastic deformation section 18 that is formed all the way around the circumference on the outer peripheral edge of each of the seal plates 10a, and the elastic deformation section 18 has an elastic force in the radially outward direction. The elastic deformation section 18 is formed on the outer peripheral edge of the seal plate 10a in an eaves shape, and when a force is applied inward in the radial direction (up and down direction in FIG. 1), the deformation section 18 is deformed elastically in the direction to shorten the outer diameter.

The inner peripheral edge of the seal plates 10a is formed into two seal lips, that is first seal lip 19, second seal lip 20. Of these, the first seal lip 19 is located on the outside in the axial direction (left and right direction in FIG. 1), and the tip edge of the first seal lip 19 comes close to and faces all the way around the circumference of the inner wall surface 15 of the seal groove 14 that is formed around the outer peripheral surface on either end of the inner race 3. In other words, the first seal lip 19 is formed around the circumference of the inner peripheral edge of the seal plate 10a such that it protrudes inward in the axial direction toward the inner wall surface 15 of the seal groove 14. In addition, a labyrinth seal is formed by the tip edge of this first seal lip 19 and the inner wall surface 15 of the seal groove 14. The seal groove 14 is defined by the inner wall surface 15 and the outer wall surface 16 as previously mentioned.

On the other hand, a second seal lip 20 is formed such that it is located on the inside in the axial direction of the first seal lip 19, and outside in the radial direction of the first seal lip 19, and the tip edge of the second seal lip 20 comes in sliding contact all the way around the circumference with a cylindrical surface 21 formed on part of the outer peripheral surface of the inner race 3 in parallel with the center axis of the inner race 3. In other words, the rolling bodies or balls 6 are held between shoulder sections 22 on both sides, and the second seal lip 20 is formed on the inner peripheral edge of the seal plate 10a such that it protrudes toward the outer peripheral surface of the shoulder section 22 on the outer surface of the inner race 3 on either axial side. The cylindrical surface 21 is continued from the inner wall surface 15.

The tip edge of this second seal lip 20 comes in sliding contact all the way around the circumference with the outer peripheral surface of the shoulder section 22, specifically with the cylindrical surface 21. With the tip edge of the second seal lip 20 in sliding contact with the cylindrical surface 21 which is parallel with the center axis of the inner race 3 in this way, there is constant sliding contact between the tip edge of the second seal lip 20 and the cylindrical surface 21 even when there is displacement in the axial direction of the inner race 3 or outer race 5. Moreover, the cross-sectional shape in the axial direction of the tip edge of the second seal lip 20 (imaginary plane surface which includes the center axis of the inner race 3) is substantially in a 'V' shape, such that the tip edge extends toward the cylindrical surface 21, and the top of the tip edge comes in sliding contact all the way around the circumference with the cylindrical surface 21. Therefore, resistance (load torque) due to the seal plate 10a does not become large.

The elastic deformation section 18 of the seal plate 10a described above is deformed elastically in a direction that its diameter is shortened, so that the elastic deformation section 18 is pressed into the attachment groove 9, and that the outer peripheral edge of the seal plate 10a is fitted into this attachment groove 9. With the seal plate 10a fitted into the attachment groove 9 in this way, the outer peripheral edge of the elastic deformation section 18 comes in tight contact all the way around the circumference with the inner peripheral surface of the attachment groove 9, and the section near the outer periphery of the surface on inside in the axial direction of the seal plate 10a comes in tight contact all the way around the circumference with an inner peripheral surface of the attachment groove 9.

Moreover, in this state, the tip edge of the first seal lip 19 comes close to and faces the inner wall surface 15 of the seal groove 14 all the way around its circumference, and the projection 33 formed on the inner peripheral surface of the tip edge of the second seal lip 20 comes in sliding contact all the way around the circumference with the outer peripheral surface of the shoulder section 22, specifically with the cylindrical surface 21. When the seal plate 10a is fitted into the attachment groove 9 as described above, the inner diameter of the first seal lip 19 that is formed on the inner peripheral edge of the seal plate 10a is regulated such that the first seal lip 19 does not interfere with the outer wall surface 16 of the seal groove 14, specifically with the outer peripheral edge of the projection 23 defining the outer wall surface 16.

In the rolling bearing with seat plate for transmission according to this invention, constructed as described above, the seal plate 10a is made of synthetic resin, so that it becomes possible to easily reduce the weight of and reuse the seal plate 10a, and by simplifying mass production with a die, and that it also becomes possible to reduce the manufacturing cost.

Moreover, it is possible to adequately secure the seal performance even when the inner race 3 or outer race 5 is displaced in the axial direction, since there is constant sliding contact between the tip edge of the second seal lip 20 all the way around the circumference with the cylindrical surface 21. In other words, of the first and second seal lips 19, 20 that are formed on the inner peripheral edge of the seal plate 10a, the second seal lip 20 is made to protrude toward the cylindrical surface 21, that is part of the outer peripheral surface of the inner race 3 in parallel with the center axis of inner race 3, and the tip edge of this second seal lip 20 comes in sliding contact all the way around the circumference with this cylindrical surface 21. This makes it possible to maintain sliding contact between the tip edge of the second seal lip 20 and the cylindrical surface 21 even when the inner race 3 or outer race 5 is displaced in the axial direction. Therefore, a rolling bearing with seal plate for transmission, in which the seal plate 10a is made of synthetic resin and low in cost, lightweight and reusable with a sufficient seal performance, is possible.

Figure 3:
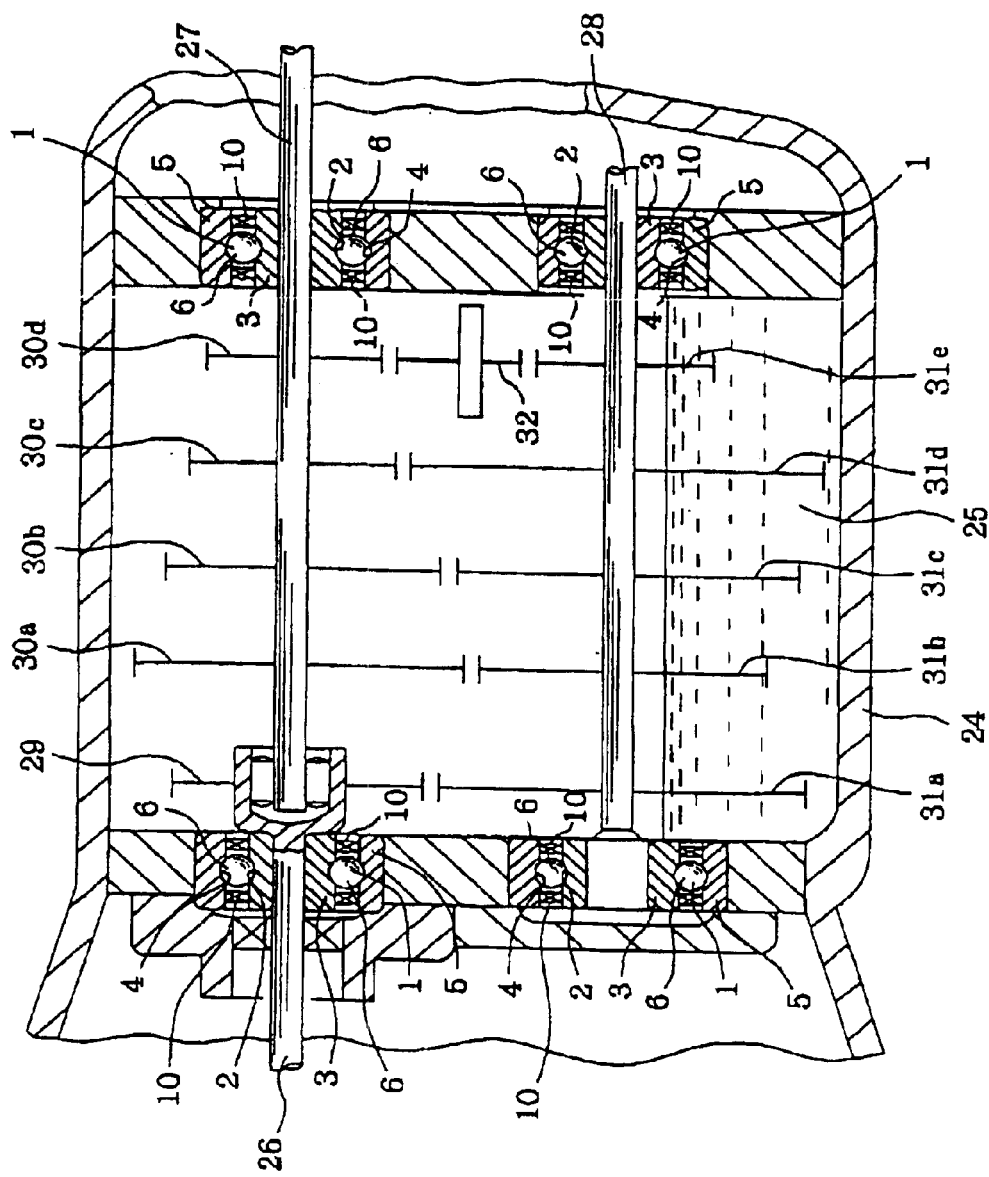
FIG. 3 is a cross sectional view of one example of the transmission to which the present invention is applied.

The rolling bearing with seal plate described above is assembled in a transmission such as shown in FIG. 3, or in conventional transmission rotation supports, to form the transmission of this invention.

In the case of this embodiment, the outer peripheral edge of the seal plate 10a is fitted in the attachment groove 9 in the outer race 5, and the tip edges of the second seal lip 20 that is formed on the inner peripheral edge of the seal plate 10a comes in sliding contact with the cylindrical surface 21 of the inner race 3. However, it is possible for the inner peripheral edge of the seal plate to fit in an attachment groove formed in the outer peripheral surface of the inner race while a seal lip is formed on the outer peripheral edge of the seal plate with its tip end edge made to come in sliding contact with the a cylindrical surface, specifically with the inner peripheral surface of the outer race, in parallel with the center axis of the outer race.

Moreover, it is also possible for the outer peripheral edge or section near the outer peripheral edge of the seal plate to be supported by the end surface in the axial direction of the outer race 5 or inner race 3 instead of by the inner peripheral surface of the outer race 5 or outer peripheral surface of the inner race 3.

When the construction of this example is worked, the interference (½ the difference between the outer diameter of the cylindrical surface 21 and the inner diameter of the protrusion 33 in its free state) in the radial direction between the protrusion 33 and the cylindrical surface 21 is kept within the range of 0.01 to 0.4 mm, and more preferably within the range 0.01 to 0.2 mm, and even more preferably within the range 0.01 to 0.08 mm.

When the interference is less than 0.01 mm, it becomes difficult to maintain the seal performance by the protrusion 33. On the other hand, when the interference is too large, the friction resistance of the sliding contact becomes large, and thus resistance to rotation of the rolling bearing with seal plate becomes large and the efficiency of the transmission, in which this rolling bearing with seal plate is installed, decreases. Therefore, the upper limit of the interference is kept at 0.4 mm, and more preferably at 0.2 mm, and even more preferably at 0.08 mm.

The value of the interference (absolute value) is given for a normal rolling bearing for transmission with seal plate in which the outer diameter of the cylindrical surface 21 is around 40 mm. When given as a ratio of the interference with respect to the outer diameter of the cylindrical surface 21, it should be within the range 0.00025 to 0.01, or more preferably, 0.00025 to 0.005, or yet even more preferably, 0.00025 to 0.002.

In the case of this embodiment, it is particularly preferred that the seal plate 10a be made of a nylon 46 that contains 25% by weight glass fiber. Moreover, it is preferable for the out-of-roundness of the seal plate 10a to be kept to 0.3 or less, and preferably 0.1 or less. For dimensional stabilization, annealing could be performed. The annealing performed in this case would be processing for approximately three hours at 180° C.

Figure 2A:
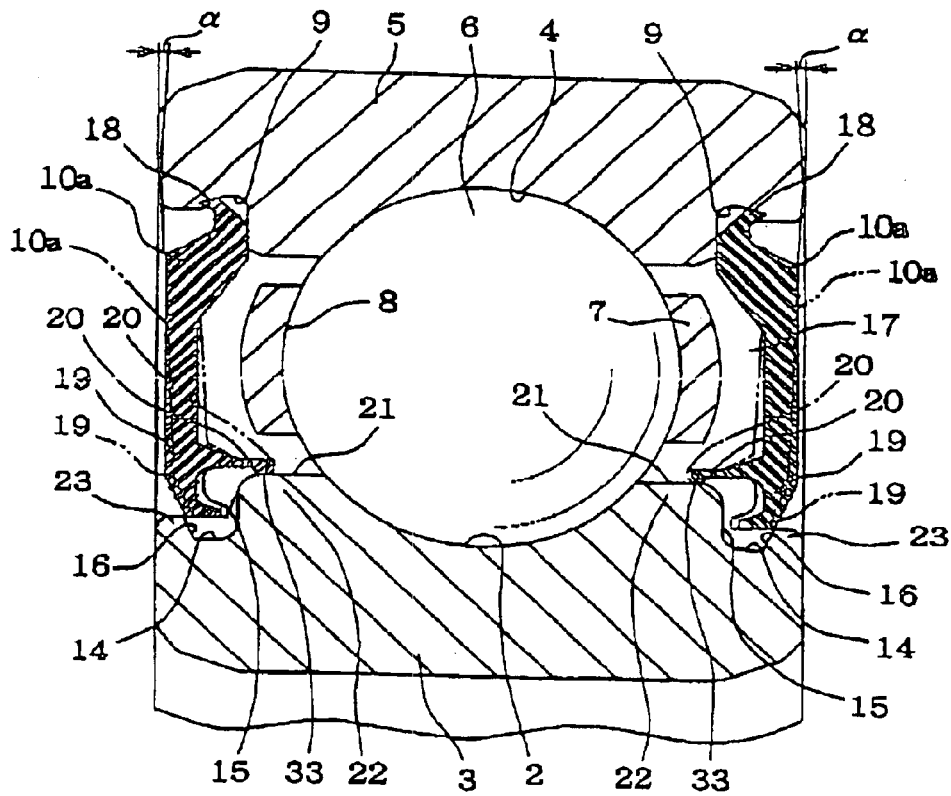
FIG. 2(a) is a cross sectional view of part of the rolling bearing in a second example of the embodiment of the present invention, where the effects of the present invention are obtained.

Next, FIG. 2(a) shows a second example of the embodiment of the invention. In this embodiment, the outer peripheral edge of the seal plate 10a is fitted in the attachment groove 9 on the outer race 5, and the tip edge of the second seal lip 20 that is formed on the inner peripheral edge of this seal plate 10a comes in sliding contact with the cylindrical surface 21 on the inner race 3, and as shown by the dashed line in FIG. 2(a), the side surface on the outside in the axial direction of the seal plate 10a is inclined toward the inside in the axial direction toward the inner peripheral edge at an inclination angle "α". In other words, the radially inner portion of the side surface is more inset than the radially outer portion thereof from the end face of the inner race 3 and outer race 5.

Therefore, even if the seal plate 10a thermally expands as the temperature rises while the rolling bearing with seal plate is in operation, so that the seal plate 10a moves in a rocking direction around the attachment groove 9, the side surface on the outside in the axial direction of the seal plate 10a does not move outside in the axial direction from the end face of the inner race 3 and outer race 5 as shown by the solid line in FIG. 2(a). In other words, the side surface is kept to be inset from the end face of the inner race 3 and outer race 5.

Figure 2B:
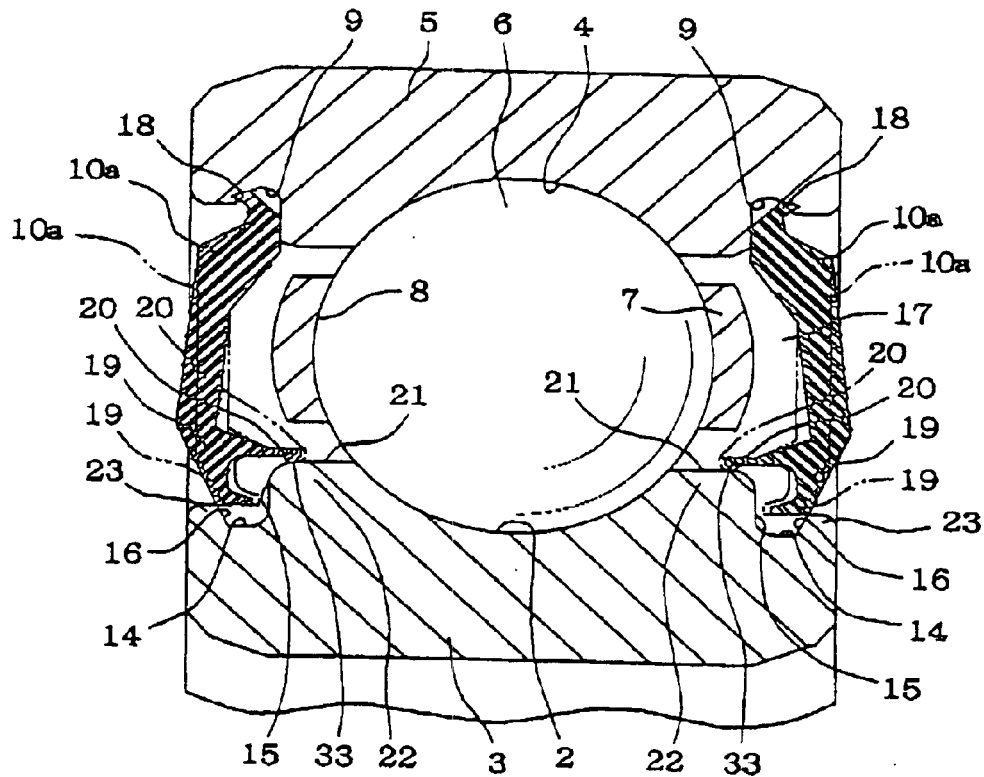
FIG. 2(b) is a cross sectional view of part of the rolling bearing in a conventional example, where an inconvenient state occurs.

In other words, as shown in FIG. 2(b), when the outside surface of the seal plate 10a is arranged such that it is orthogonal to the axial direction in its normal position, this seal plate 10a thermally expands from the condition shown by the dashed line to that shown by the solid line, and there is a possibility that the side surface on the outside in the axial direction of the seal plate 10a will move outside in the axial direction from the end surface of the inner race 3 and outer race 5.

However, with the construction of this embodiment, no part of the seal plate 10a will move from the end surface of the inner race 3 and outer race 5. Moreover, there is no drop in the seal performance of the seal plate 10a due to interference with the members adjacent to the seal plate 10a even when the seal plate 10a expands thermally.

In order to make it more difficult for the seal plate to expand thermally, it is also preferable that the seal plate be made of a synthetic resin that is reinforced with a reinforcing fiber such as glass fiber. In other words, by mixing glass fiber into the synthetic resin it is possible to reduce the linear expansion coefficient of the seal plate. In this case, it is preferred that the amount of glass fiber contained in the synthetic resin be 10 to 50% by weight in order to secure the formability and strength of the synthetic resin containing glass fiber, and in order to reduce the linear expansion coefficient.

The other construction and function is substantially the same as in the first example, so any redundancies are omitted.

The rolling bearing with seal plate of this example, described above, also is assembled in rotation supports of a transmission such as shown in FIG. 3, or of various conventional transmissions, to form the transmission of this invention.

Next, testing performed by the inventors will be explained. This test was performed to compare synthetic resin with rubber as the material for a seal plate used under high-temperature conditions, and to confirm that synthetic resin is preferred. In other words, rubber (nitrile rubber (NBR) and acrylic rubber) and synthetic resin (polyamide resins, specifically nylon 66 and nylon 46) were immersed in hot transmission oil, and the tensile strength and elongation of the rubbers and synthetic resins before and after immersion were measured. The test results are shown in Table 1. For the rate of change of the tensile strength and elongation in Table 1, the amount of change before and after immersion is given as a percentage of the value before immersion. Moreover, the temperature of the transmission oil was 120° C. for nitrite rubber, and 150° C. for acrylic rubber, nylon 66 and nylon 46.

TABLE 1

| Immersion Time | Measurement Item | Material: Rubber | | Material: Resin | |
|---|---|---|---|---|---|
| | | Nitrile rubber | Acrylic rubber | Nylon 66 | Nylon 46 |
| 336 Hr | Rate of change in tensile strength(%) | −57 | +8 | +5 | +9 |
| | Rate of change in elongation (%) | −56 | −24 | −2 | +4 |
| 504 Hr | Rate of change in tensile strength (%) | −60 | +3 | −2 | +8 |
| | Rate of change in elongation (%) | −68 | −33 | −16 | −1 |

As can clearly be seen from Table 1, the synthetic resin is less in comparison to rubber, in the rate of change in tensile strength and elongation of synthetic resin when immersed in hot transmission oil. In other words, it is more difficult for synthetic resin to degrade (become hard). In the case of a rolling bearing with seal plate that is assembled in an automobile transmission where hot oil constantly comes in contact with the seal plate, by constructing the seal plate using synthetic resin, it is possible to prevent the seal performance from decreasing. Moreover, it is possible to prevent degradation of the oil due to degradation of the seal plate.

Next, seals essentially consisting of nitrile rubber, acrylic rubber, nylon 66 and nylon 46, respectively, are assembled in a bearing, and then the bearings are installed in transmissions, respectively, for endurance tests under the following test condition. As a result, it is found out that the resin seal is superior to the rubber seals in seal performance. The abnormal events in Table 2 are flaking on the ball rolling surface of the inner race.

Test Condition
- Radial load: 10,000N
- Axial Load: 3,000N
- Number of Rotation: 3,000 rpm
- Oil used: transmission oil
- Oil Temperature: 150±5° C.
- Amount of Foreign matter: 0.4 g/l Test Results

TABLE 2

| (Time lapse until abnormal events occur: hrs) | | | | |
|---|---|---|---|---|
| | Nitrile rubber | Acrylic rubber | Nylon 66 | Nylon 46 |
| 1 | 31 | 103 | 166 | 191 |
| 2 | 40 | 116 | 154 | 173 |

This invention is constructed and function as described above, so a rolling bearing with seal plate for use in transmission, in which the seal plate is constructed of a low cost, lightweight and reusable synthetic resin that is not readily degraded by transmission oil, is possible. As a result, the invention contributes to the improvement of the reliability of the transmission.

When foreign matter gets inside the rolling bearing, indentations are produced in the rolling contact surface due to the foreign matter, and thus surface fatigue and damage occurs easily due to the indentations, so that the life of the rolling bearing is shortened. However, with this invention, the tip edge of the seal lip is in constant sliding contact all the way around the circumference with the cylindrical surface of the race regardless of whether or not there is displacement in the axial direction, so it is difficult for foreign matter such as dirt to get inside the bearing, making it possible to maintain a sufficient seal.

In addition, it is possible to keep surface fatigue to a minimum, thus lengthening the life of the rolling bearing with seal plate for transmission.

What is claimed is:

1. A rolling bearing with seal plate for transmission comprising: an inner race that has an outer peripheral surface formed with an inner ring raceway in an axially middle portion; an outer race that has an inner peripheral surface formed with an outer ring raceway in an axially middle portion; a plurality of rolling bodies that are rotatably located between the inner ring raceway and the outer ring raceway; and a seal plate that is made of synthetic resin and has peripheral edges such that one of the peripheral edges is attached to part of one of the inner race and outer race, while the other of the peripheral edges is defined by at least one seal lip, the peripheral surface of the other of the inner race and the outer race partly defined by a cylindrical surface in parallel to the center axis of the other race, and the at least one seal lip extending to the side of the rolling bodies, protruding toward the cylindrical surface and having a tip edge coming in sliding contact all the way around the cylindrical surface.

2. The rolling bearing with seal plate of claim 1, wherein the other race is formed with shoulder sections between which the rolling bodies are held, and the cylindrical surface on which the tip edge of the at least one seal lip comes in sliding contact is a peripheral surface of the shoulder sections.

3. The rolling bearing with seal plate of claim 1, wherein the tip edge of the at least one seal lip has a cross-section with reference to the axial direction substantially in a "V" shape, protruding toward the cylindrical surface, and that the apex of the tip edge comes in sliding contact all the way around the circumference with the cylindrical surface.

4. The rolling bearing with seal plate of claim 1, wherein the seal plate has a side surface on the outside in the axial direction that is inclined toward the inside in the axial direction toward the other of the peripheral edges.

5. The rolling bearing with seal plate of claim 1, wherein the seal plate is made of a synthetic resin that is reinforced with a glass fiber.

6. A transmission comprising: a casing in which lubrication oil is held; an input shaft and output shaft which are rotatably supported inside the casing by rolling bearings constructed by claim 1; a power transmission member on the drive side which is supported by and rotates with the input shaft; a power transmission member on the follower side which is supported by the output shaft so as to be engaged with the power transmission member an the drive side for power transmission, so that it rotates with the output shaft as the input shaft rotates.

* * * * *